United States Patent [19]

Suzuki et al.

[11] Patent Number: 5,155,416
[45] Date of Patent: Oct. 13, 1992

[54] ELECTRON BEAM EMITTING DEVICE AND IMAGE DISPLAYING DEVICE BY USE THEREOF

[75] Inventors: Hidetoshi Suzuki, Atsugi; Ichiro Nomura, Yamato; Tetsuya Kaneko, Yokohama; Toshihiko Takeda, Tokyo; Yoshikazu Banno, Atsugi; Kojiro Yokono, Yokohama, all of Japan

[73] Assignee: Canon Kabushiki Kaisha, Tokyo, Japan

[21] Appl. No.: 254,150

[22] Filed: Oct. 6, 1988

[30] Foreign Application Priority Data

Oct. 12, 1987 [JP] Japan .................. 62-254557

[51] Int. Cl.$^5$ .................. H01J 29/70; H01J 29/72
[52] U.S. Cl. .................. 315/366; 313/422; 315/169.3
[58] Field of Search .................. 315/366, 169.3; 313/422, 441, 446, 494, 306, 291

[56] References Cited

U.S. PATENT DOCUMENTS

| | | | |
|---|---|---|---|
| 4,137,551 | 1/1979 | Rajchman | 315/169.3 |
| 4,535,272 | 8/1985 | Ueda et al. | 315/366 |
| 4,651,058 | 3/1987 | Hamada et al. | 313/422 |

Primary Examiner—Theodore M. Blum
Attorney, Agent, or Firm—Fitzpatrick, Cella, Harper & Scinto

[57] ABSTRACT

An electron beam emitting device, includes a surface conduction type of thin film device having an electron emitting area and at least a pair of electrodes for passing current through the electron emitting area, and a voltage applicator for applying a voltage independently on each of the electrodes, the voltage applicator applying a voltage on each electrode so that each of the electrodes may become higher or lower in potential relative to the other electrode.

24 Claims, 6 Drawing Sheets

ELECTRON BEAM EMITTING DEVICE AND IMAGE DISPLAYING DEVICE BY USE THEREOF

BACKGROUND OF THE INVENTION

1. Field of the Invention

This invention relates to an electron beam emitting device and an image displaying device using an electron beam emitting device and more particularly to a thin type electron beam emitting device or an image displaying device using a surface conduction type of thin film device or an electron emitting device similar thereto.

2. Related Background Art

In recent years, in the field of information equipment or TV receivers for domestic use, a thin type image displaying device with good visual recognition has been demanded. In the prior art, thin type image displaying devices such as a liquid crystal displaying device, an EL displaying device, a plasma display panel, etc., have been developed. However, these devices have problems relating to the visual angle, color formation, luminosity, etc. As a result they cannot be said to satisfy the performance standards quality demanded by the market.

In addition, in the prior art, devices capable of obtaining emission of electrons with a simple structure, there have been developed, for example, the cold cathode-ray device reported by M. I. Elinson [Radio Eng. Electron. Phys. vol. 10, 1290-1296, 1965]. This device utilizes the phenomenon that electron emission occurs by passing current through a thin film with small area formed on a substrate in parallel to the thin surface, and is generally called the surface conduction type of thin film device.

Examples of such surface conduction type of thin film device include the one using a $SnO_2$ (Sb) thin film developed by Elinson et al as mentioned above; one using an Au thin film [G. Dittmer: "Thin Solid Films", vol. 9, p. 317, 1972]; one using an ITO film [M. Harwell and C. G. Fonstad: "IEEE Trans. ED Conf.", p. 519, 1975]; and one using a carbon thin film [Hisashi Araki et al: "Vacuum", vol. 26, No. 1, p. 22, 1983].

These surface conduction type devices have the following advantages:

1) High electron emitting efficiency can be obtained.
2) Their simple structure affords easy production.
3) A large number of devices can be formed (multi-formation) on the same substrate.

Accordingly, if these surface conduction type of thin film devices can be utilized as the electron generating source for a flat plate type CRT image displaying device, an image displaying device having a better visual angle, having better color formation and luminosity and having lower consumption power, etc. than a flat plate type CRT displaying device can be provided.

However, when a surface conduction type of thin film device is utilized as an electron generating source of an image displaying device, if the same number of surface conduction type of thin film devices are provided as the number of displaying picture elements for excitation of phosphor, the number of the devices will become enormous, whereby the production yield will be lowered thereby resulting in increased cost. On the other hand, if the whole image surface is scanned by use of a single device, the structure of the device will become complicated as in the case of the CRT of the prior art, whereby it is impossible to realize thinning of the device.

Figure 7:
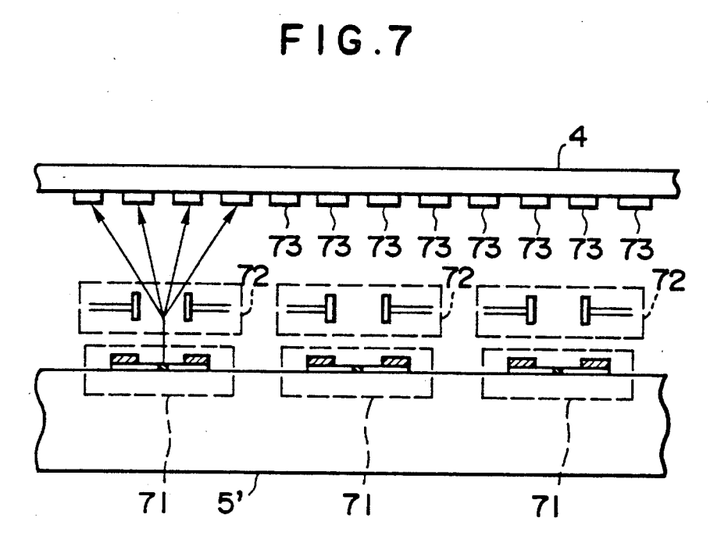
FIG. 7 is an illustration of the image displaying device by use of the surface conduction type of thin film device of the prior art.

Accordingly, as a compromise, if some picture elements to some 10 picture elements are allocated for one device, it becomes possible to ballance both the production yield of the device and thinning of the device at a high level. However, even in that case, for scanning of an electron beam, deflectors are required to be equipped for each device, and yet the deflector of the prior art had a complicated electrode shape as shown in FIG. 7. Therefore, it has been difficult to make the device thin or to constitute them in multiple forms. In the Figure, 71 encircled with a dotted line shows one device of the surface conduction type discharging device, 72 encircled similarly with a dotted line shows one deflector, 73 denotes one picture element of an emitting member and 74 denotes a glass plate.

SUMMARY OF THE INVENTION

The present invention has been developed in order to solve the drawbacks of the prior art examples as described above, and its principal object is to provide an electron beam emitting device and an image displaying device capable of extremely simplifying and making thinner the structure of a displaying device without the need of providing the device with a deflector for control of the track of the electron beam. This is accomplished by utilizing as the electron emitting source a surface conduction type releasing device which can provide sufficient electron emission and can be also produced with ease and formed into a multi-type device due to its simple structure.

According to an aspect of the present invention, there is provided an electron beam emitting device, comprising a surface conduction type of thin film device having an electron emitting area and at least a pair of electrodes for passing current through the electron emitting area, and a voltage applying a voltage means for applying independently on each of the electrodes, the voltage applying means being means for applying a voltage on each electrode so that each of the electrodes may have a higher or lower potential relative to the other electrode.

The present invention also provides an electron beam emitting device, comprising a surface conduction type of thin film device having an electron emitting area and at least a pair of electrodes for passing current through the electron emitting area, and a voltage applying a voltage means for applying independently on each of the electrodes, the voltage applying being means capable of varying the magnitude of the voltage applied on each electrode and applying a voltage on each electrode so that each of the electrodes may have a higher or lower potential relative to the other electrode.

In another aspect of the present invention, there is provided an image displaying device comprising an electron beam emitting device and a light emitting member which draws an image by emitting light from the light emitting member by irradiation of the electron beam emitted from the electron beam emitting device, the electron beam emitting device having a surface conduction type of thin film device having an electron emitting area and at least a pair of electrodes for passing current through the electron emitting area, and a voltage applying means for applying a voltage independently on each of the electrodes, the voltage applying means being means for applying a voltage on each electrode so that each of the electrodes may have a higher or lower potential relative to the other electrode.

The present invention further provides an image displaying device comprising an electron beam emitting device and a light emitting member which draws an image by emitting light from the light emitting member by irradiation of the electron beam emitted from the electron beam emitting device, the electron beam emitting device having a surface conduction type of thin film device having an electron emitting area and at least a pair of electrodes for passing current through the electron emitting area, and a voltage applying a voltage means for applying a voltage independently on each of the electrodes, the voltage applying means being means capable of varying the magnitude of the voltage applied on each electrode and applying a voltage on each electrode so that each of the electrodes may have a higher or lower potential relative to the other electrode.

DETAILED DESCRIPTION OF THE PREFERRED EMBODIMENTS

In the present invention, a surface conduction type of thin film device is used as the electron beam emitting source, and for the surface conduction type of thin film device itself, all of those known in the art can be utilized, and its constitution and shape are not particularly limited, so long as they do not interfere with the function of the device according to the present invention.

Figure 6:
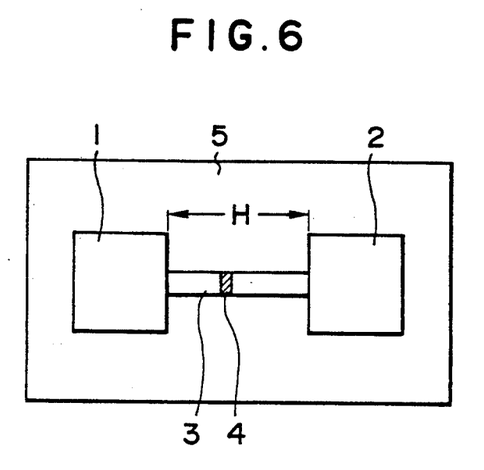

An example of the surface conduction type of thin film device to be used in the present invention is shown in FIG. 6. In FIG. 6, numerals 1 and 2 denote electrodes for obtaining an electrical connection, 3 denotes a thin film formed of an electron emitting material, 5 denotes a substrate and 4 denotes an electron emitting area.

In the above surface conduction type of thin film device, as a method for forming the electron emitting area 4, for example, there may be included a method according to current passage heat treatment called forming in which current is passed through the thin film 3 by applying a voltage between electrodes 1 and 2 to destroy, deform or denature locally the thin film 3 with Joule's heat generated thereby, thus forming an electron emitting area 4 made to have an electrically high resistant state to obtain an electron emitting function, or a method to obtain the electron emitting function without passing through the forming step by a dispersion arrangement of fine particles comprising a metal or oxide, etc. at the fine interval portion 3 between a pair of confronting electrodes 1, 2 having a fine interval. However, these methods are not the only methods contemplated by the present invention for forming the electron emitting area 4; the electron emitting area may be formed according to any method, provided that a sufficient electron discharge can be realized.

Further, for the substrate 5 in the surface conduction type of thin film device to be used in the present invention, for example, an insulating material such as glass, quartz, etc. may be employed. The thickness of the substrate may be about a 100 μm to 1 mm, and when it is used also as the back plate as described below, a thickness of around 5 mm may be preferred.

The electrodes 1 and 2 can be formed according to, for example, the methods conventionally employed a vacuum vapor deposition process and a photolithographic process, etc. The materials for the electrodes 1 and 2 may be general electroconductive materials, including metals such as Ni, Al, Cu, Au, Pt, Ag, etc. and metal oxides such as $SnO_2$, ITO, etc.

The thickness of the electrode may be suitably some 100 Å to several μm, preferably 0.01 to 2 μm.

The interval between the electrodes 1 and 2, namely the electrode gap H may be from 0.1 μm to several μm, but the present invention is not limited thereto.

As to the shape of electrodes 1 and 2, it is not particularly limited, provided that an electron discharge with good efficiency can be realized.

Formation of the electron emitting area 4 between the electrodes 1 and 2 can be practiced by forming the thin film 3 according to vacuum deposition, etc. by use of an electron emitting material, for example, a metal oxide such as $In_2O_3$, $SnO_2$, PbO, etc. a metal such as Ag, Pt, Al, Cu, Au, etc., carbon and other various semiconductors, etc. and applying a forming treatment thereto similarly as in the prior art.

As another method for forming the electron emitting area 4, there may be also employed a method in which a dispersion containing fine particles of the above electron emitting material dispersed in a dispersing medium is coated on the substrate by dipping or spin coating, etc., followed by calcination. As the dispersing medium in this case, any medium capable of dispersing fine particles without denaturation, such as butyl acetate, alcohols, methyl ethyl ketone, cyclohexane and mixtures of these, etc. can be used. The fine particles should have particle sizes preferably of some 10 Å to several μm.

The electron beam emitting device of the present invention generates an electron beam by applying a voltage between the electrodes 1 and 2 of the above surface conduction type of thin film device, thereby passing current through the electron emitting area 4, and such means for applying a voltage can apply the voltage so that, for example, the electrode 1 may be higher or lower in potential relative to the electrode 2. That is, the first specific feature resides in that the direction of current flowing through the electron emitting area 4 can be reversed at any suitable time from the electrode 1→2 direction to the electrode 2→1 direction, and further the second specific feature of the above means for applying voltage resides in that the voltage applied between the electrodes 1 and 2 can be made variable.

Figure 5A:
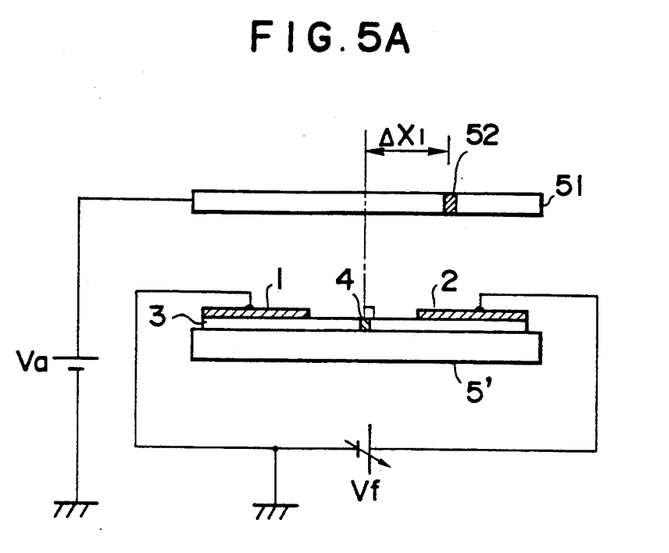
FIG. 5A, FIG. 5B and FIG. 6 are illustrations showing the constitution of the surface conduction type of thin film device.
Figure 5B:
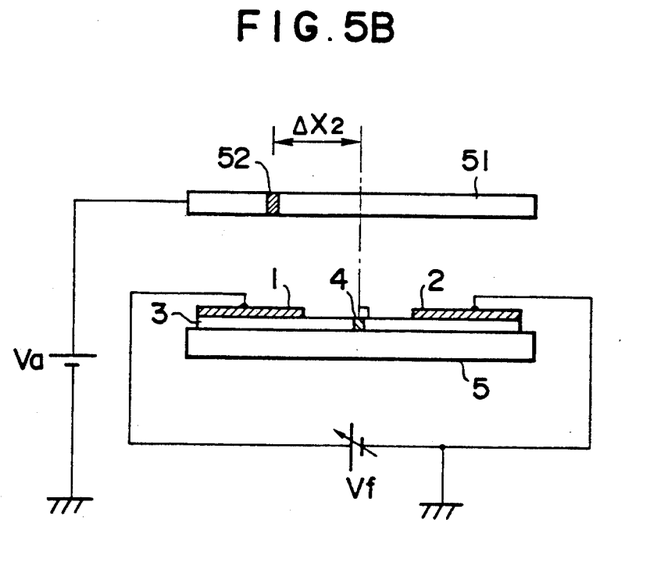

Prior to completion of the present invention, the present inventors have experimentally confirmed that there is the relationship as shown in FIG. 5 between the voltage applied between the two electrodes and the track of the electron beam in the surface conduction type releasing device.

In FIGS. 5A and 5B, 1 and 2 denote electrodes provided for applying a voltage, 3 denotes thin film of a material such as metal or metal oxide as described above (depending on the material of the thin film 3, the same material as electrodes 1 and 2 may be also used), 4 denotes an electron emitting area formed by applying treatment called forming known in the art on the above thin film 3, and 5 denotes substrate.

Also, 51 denotes the collector electrode for capturing the electron beam discharged from the device and is coated on the surface with an organic resist for recording the site on which the electron beam is irradiated.

According to the experiments conducted by the present inventors, as shown in the same FIG. 5A, when a constant voltage Va was applied-on the collector electrode 51 and a voltage Vf between the electrode 1 and 2 of the device (Va>Vf>0), the exposure point 52 of the resist was found to be at a position deviated toward the side of the electrode 2 as compared to the normal line (broken line) of the electron emitting area 4. Besides, when the voltage Vf was varied at constant voltage of Va, it has been found that the displacement amount $\Delta x_1$ becomes greater as the voltage Vf is made greater. Also, as shown in the same FIG. 5B, when the polarity of the voltage applied between the electrodes 1 and 2 was reversed, the exposure point 52 was transferred to the side of the electrode 1, and similarly as in the case of FIG. 5A, the displacement amount $\Delta x_2$ became greater as the Vf was made greater.

The present invention has been accomplished on the basis of the experimental results as described above. The displacement amount $\Delta x$ by caused the applied voltage Vf will vary depending on the surface or size of the surface conduction type of thin film device, the material to be used for the thin film 3, the distance between the device and the collector electrode, the applied voltage Va at the collector electrode, etc., but the present invention is applicable to any such case.

The present invention is described in more detail by referring to the drawings.

Figure 1:
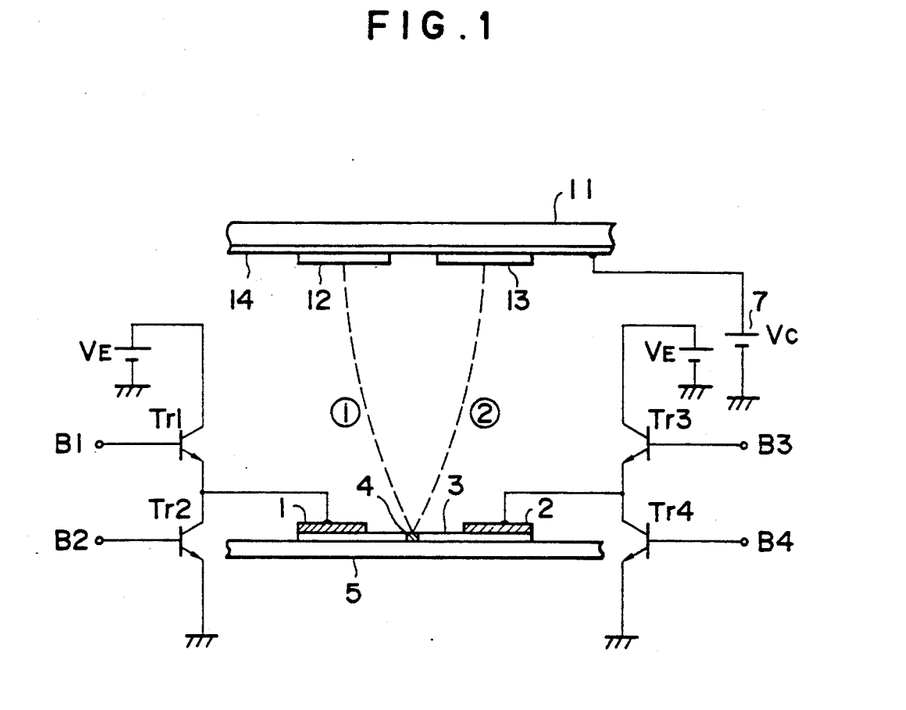
FIG. 1 is an illustration showing an embodiment of part of the image displaying device of the present invention.

FIG. 1 is a partial illustration showing an embodiment of the image displaying device of the present invention, which shows a large number of displaying units constituting the image displaying device. In the Figure, reference numerals 1 to 4 refer to the same elements described in FIG. 5 above, showing the respective parts of the surface conduction type of thin film device. Elements 5 and 11 consist of glass members shaped in the form of plates, and constitute the back plate 5 and the face plate 11 of the image displaying device. A vacuum vessel is formed by the above back plate 5, the face plate 11 and side plates (not shown), and is internally maintained at a vacuum degree of around $1 \times 10^{-6}$ torr. On the inner surface of the face plate 11, light emitting members 12 and 13 are coated separately in mosaic with a transparent electrode 14 sandwiched therebetween.

On the above transparent electrode is applied from the high voltage power source 7 an acceleration voltage of, for example, Vc=10 kV.

In the image displaying device of this embodiment, the specific feature resides in reversing the voltage polarity applied between the electrodes of the surface conduction type of thin film device at any suitable time, namely reversing the direction of the current flowing through the electron emitting area 4 by applying a voltage between the electrodes 1 and 2 so that, for example, the electrode 1 may be higher or lower in potential relative to the electrode 2. Tr1, Tr2, Tr3 and Tr4 shown in the Figure are transistors of the switching device for that purpose. The transistors Tr1 and Tr2 control the voltage applied on the electrode 1, while the transistors Tr3 and Tr4 control the voltage applied on the electrode 2. ON or OFF switching of each transistor can be controlled externally through the base terminals B1 to B4.

In the present device, there exist the three actuation states, namely:

(i) the electron beam emitted from the surface conduction type of thin film device travels along the track shown by ① in FIG. 1, whereby the light emitting member 12 emits light;

(ii) the electron beam emitted from the surface conduction type of thin film device travels along the track shown by ② in FIG. 1 (2), whereby the light emitting member 13 emits light; and (iii) the surface conduction type device is not driven, whereby the electron beam is turned OFF to effect no emission.

The actuations of the transistors Tr1 to Tr4 as shown in Table 1 determines which of these three actuation state occurs.

TABLE 1

|  | Electron Beam ① | Electron Beam ② | Electron Beam OFF |
| --- | --- | --- | --- |
| Tr1 | O | X | X |
| Tr2 | X | O | O |
| Tr3 | X | O | X |
| Tr4 | O | X | O |

Note
O: Transistor ON
X: Transistor OFF

For example, when the transistors Tr1 and Tr4 are ON, Tr2 and Tr3 are OFF, $V_E[V]$ is applied on the electrode 1 and 0[V] on the electrode 2 in FIG. 1, whereby the electron beams travels along the track ①, as apparently seen from the description for FIG. 5B as described above (actuation state (i)).

When the transistors Tr2 and Tr3 are ON, Tr1 and Tr4 are OFF, the voltages applied on and the electrode 1 and the, electrode 2 are reversed, whereby the electron beam is deflected toward the electrode 2 side and travels along the track ② (actuation state (ii)).

On the other hand, when the transistors Tr2 and Tr4 are ON, Tr1 and Tr3 are OFF, since 0[V] is applied on both of the electrode 1 and the electrode 2, and no electron emission will occur (actuation state (iii)).

Accordingly, by applying an appropriate signal on the base terminals B1 to B4, one of the light emitting members 12 or 13 can be lighted selectively, or by repeating alternately the states (i) and (ii) about 60 times per second, both picture elements can be displayed as if lighted in visual effect.

In the image displaying device practically prepared by the present inventors, the display units shown in the above FIG. 1 were juxtaposed so that 200×200 are juxtaposed in the vacuum vessel. By driving each unit independently, a display of 200×400 picture elements is possible, which is very suitable for the display of letters or figures.

Besides, while having a luminosity of 100 ft-L, the thickness of the device is as thin as about 3 cm.

Thus, according to FIG. 1, a display of high luminosity can be obtained with a very simple structure. Therefore, an information instrument terminal displaying for example, letters or figures can be provided at a low cost.

Figure 2:
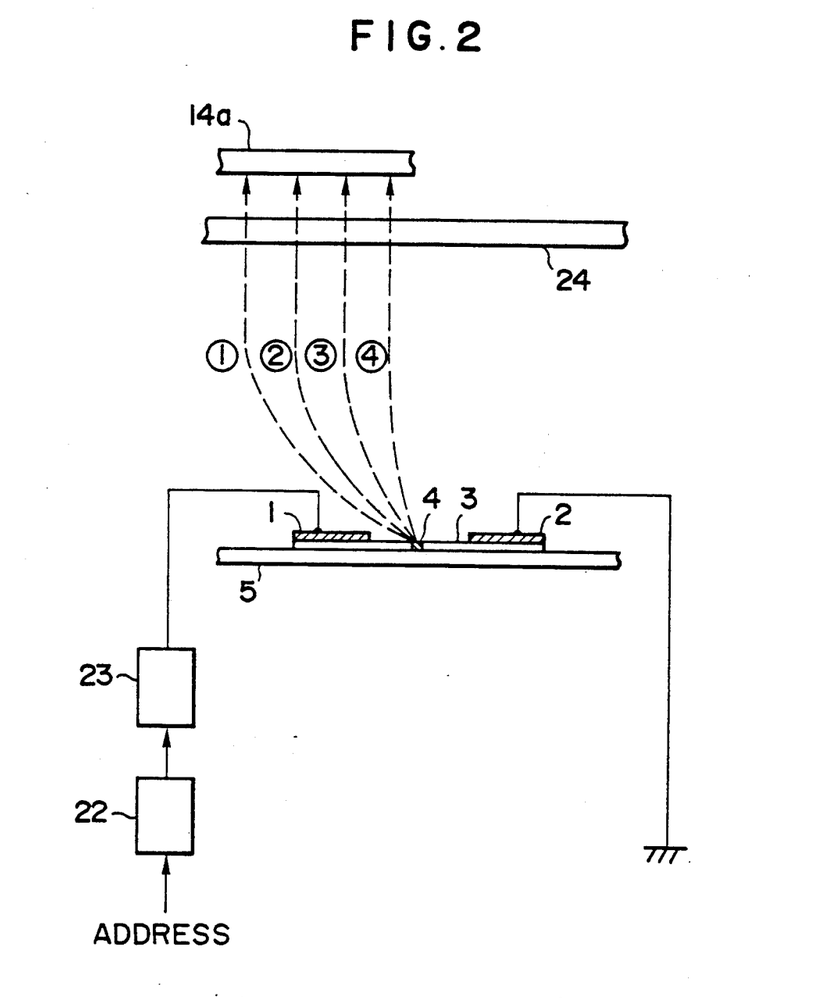
FIG. 2, FIG. 3 and FIG. 4 are illustrations showing other embodiments of parts of the displaying device.

As the unit of the electron beam emitting device of the present invention, it is also possible to use the form shown in FIG. 2 in combination. First, in FIG. 2, as the voltage to be applied on the surface conduction type of thin film device, the four combinations shown in Table 2 can be used, whereby a desired track ① to ④ can be selected.

TABLE 2

| Electron Track | Applied Voltage at the electrode 1 | Applied Voltage at the electrode 2 |
| --- | --- | --- |
| ① | V1 | 0 |
| ② | V2 | 0 |
| ③ | V3 | 0 |
| ④ | V4 | 0 |

Note
V1 > V2 > V3 > V4 > 0

Also, by varying continuously the applied voltage, it is also possible to draw a continuous line through the electrode 24 withdrawing the electrons emitted from the electron emitting area 4 onto the target.

Further, in the image displaying device of the present invention, a D/A converter 23 and a memory 22 may be also provided as shown in FIG. 2. In this case, within the memory 22, the voltage to be applied on the electrode 1 is previously stored in order to permit electron beams to travel along the respective tracks of ① to ④, and the data are set so as to be output to the D/A converter 23 by designating the address externally.

The D/A converter 23 is set so as to generate a voltage based on the numerical data output from the memory 22.

Figure 3:
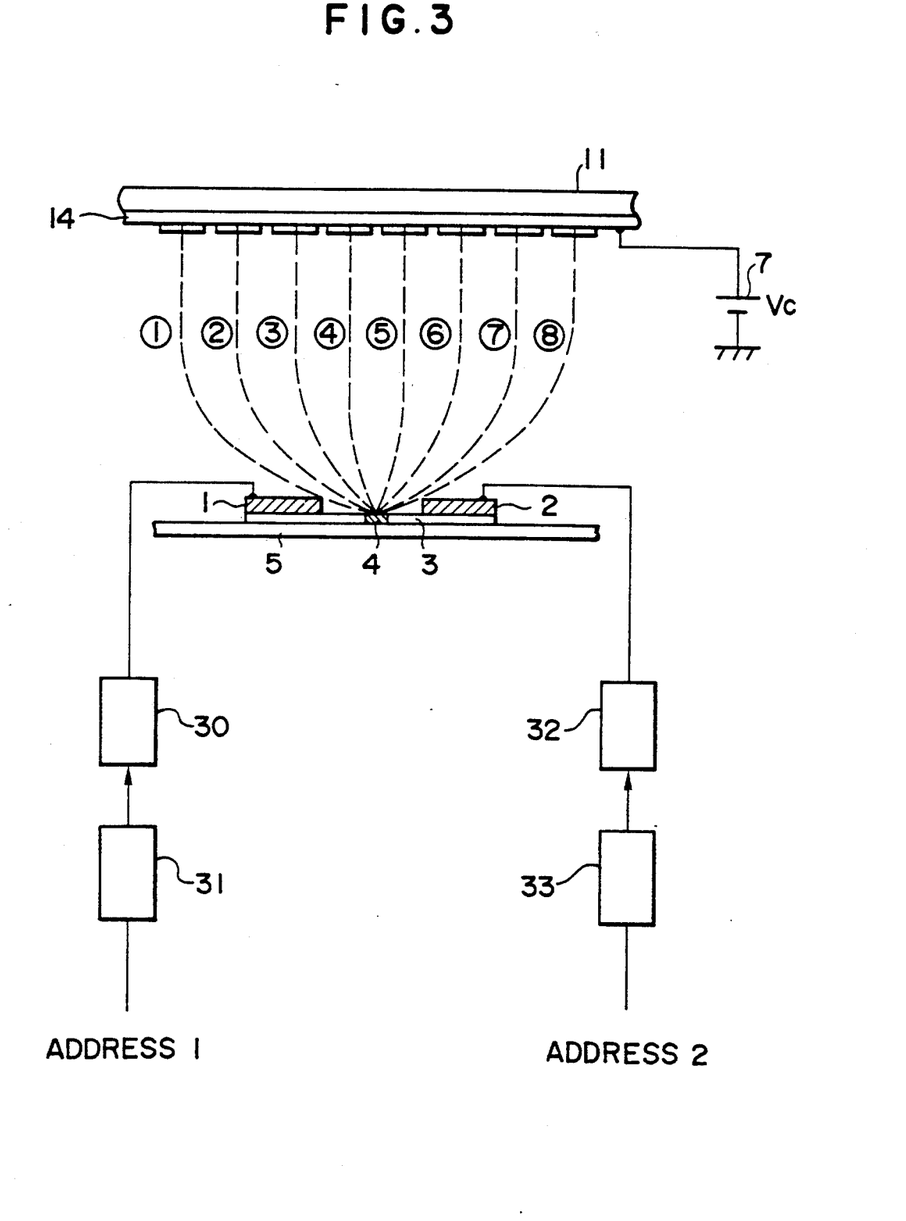

FIG. 3 shows the embodiment in which the form shown in FIG. 2 is used in combination with the form shown in FIG. 1.

In FIG. 3, reference numerals 1 to 5, 7, 11 and 14 refer to the same structures as shown above in FIG. 1, but in this embodiment, for the electrodes 1 and 2, memories 31 and 33, and D/A converters 30 and 32 are provided, respectively. By designating addresses externally to the memories 31 and 32, five potentials V1, V2, V3, V4 and 0[V] (where V1>V2>V3>V4>0) can be selectively applied on the electrodes 1 and 2. By this, the track of the electron beam can be selected to be one of tracks ① to ⑧ as shown in the Table 3 below.

TABLE 3

| Electron Track | Applied Voltage at the electrode 1 | Applied Voltage at the electrode 2 |
| --- | --- | --- |
| ① | V1 | 0 |
| ② | V2 | 0 |
| ③ | V3 | 0 |
| ④ | V4 | 0 |
| ⑤ | 0 | V1 |
| ⑥ | 0 | V2 |
| ⑦ | 0 | V3 |
| ⑧ | 0 | V4 |
| Non-lighting | 0 | 0 |

In the image displaying device of the present invention shown in FIG. 3, which has a means for reversing the direction of current flowing through the electron emitting area at any suitable time by applying a potential difference between both electrodes so that each electrode may be higher or lower in potential than the other electrode as shown in FIG. 1 and a means for changing the potential difference applied between both electrodes at any suitable time as shown in FIG. 2 in combination, two or more picture element displays for one electron emitting device are possible.

Figure 4:
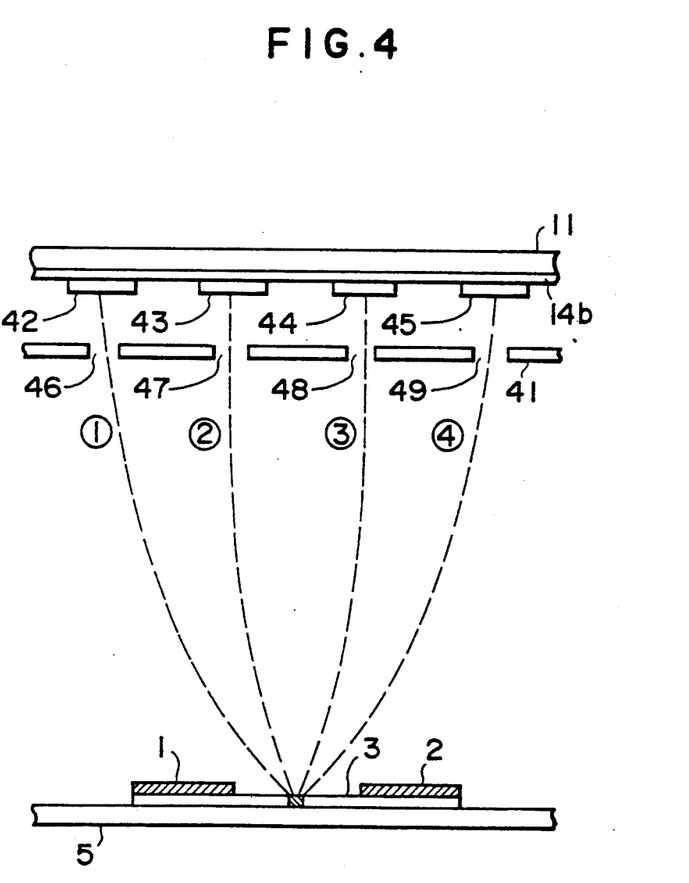

Also, as the unit of the displaying device of the present invention, the form shown in FIG. 4 can be employed. In the case of this device, by use of the four combinations shown in Table 4, one desired picture element of the light emitting members 42 to 45 can be permitted to emit light.

TABLE 4

| Electron Track | Applied Voltage at the electrode 1 | Applied Voltage at the electrode 2 |
| --- | --- | --- |
| ① | V1 | 0 |
| ② | V2 | 0 |
| ③ | 0 | V2 |
| ④ | 0 | V1 |

Note
V1 > V2 > 0

In the case of this embodiment, a plate electrode 41 is held between the surface conduction type of thin film device and the light emitting member. The plate electrode 41 is provided with holes 46 to 49 for permitting the electron beam to be transmitted therethrough.

The plate electrode 41 has applied thereto a voltage lower than the voltage Va (voltage applied on the transparent electrode 14b), and the following effects can be obtained by selecting an appropriate voltage:

(a) A-through-the-lens effect can occur where the electron beam is narrowed at the light emitting member surface, and therefore the emitting spot becomes sharp.

(b) The deflection sensitivity is increased. That is, as compared with the case when no plate electrode 41 is provided, deflection of the electron beam becomes possible with a smaller voltage (V1, V2).

As described above, according to the present invention, since deflection of the electron beam is possible without the provision of a deflector at the electron beam emitting source, a displaying device can be obtained with an extremely simple structure.

As the result, in spite of having the same high luminosity as a CRT of the prior art, a displaying device with a thickness which can be less than half of that of CRT of the prior art can be provided at a low cost.

What is claimed is:

1. An electron beam emitting device, comprising;
    a thin film device of a surface conduction type, said thin film device comprising:
        a substrate;
        an electron emitting area; and
        at least a pair of electrodes for passing current through said electron emitting area, wherein said electron emitting area and said electrodes are provided on said substrate and electrons are emitted by passing a current through said electron emitting area; and
    voltage applying means for independently applying a voltage to each of said electrodes, wherein said voltage applying means applies a voltage to each of said electrodes so that one of said electrodes may become higher or lower in potential relative to the other of said electrodes.

2. An electron beam emitting device according to claim 1, wherein said voltage applying means has a power source and a switch provided between said power source and said electrodes.

3. An electron beam emitting device according to claim 1, wherein said voltage applying a means is a means for applying voltage on either one of said electrodes.

4. An electron beam emitting device according to claim 1, wherein said voltage applying means applies a voltage on one of said electrodes, and applies no voltage on the other of said electrodes.

5. An electron beam emitting device, comprising:
a thin film device of a surface conduction type, said thin film device comprising:
  a substrate;
  an electron emitting area; and
  at least a pair of electrodes for passing current through said electron emitting area, wherein said electron emitting area and said electrodes are provided on said substrate and electrons are emitted by passing a current through said electron emitting area; and
voltage applying means for applying a voltage independently to each of said electrodes, said voltage applying means varying the magnitude of the voltage applied to each of said electrodes, wherein said voltage applying means applies a voltage to each of said electrodes so that one of said electrodes may become higher or lower in potential relative to the other of said electrodes.

6. An electron beam emitting device according to claim 5, wherein said voltage applying means has a power source and a D/A converter.

7. An electron beam emitting device according to claim 5, wherein said voltage applying means applies a voltage on either one of said electrodes.

8. An electron beam emitting device according to claim 5, wherein said voltage applying means applies a voltage on one of said electrodes, and applies no voltage on the other of said electrodes.

9. An electron beam emitting device according to claim 5, wherein said voltage applying means has a memory means for memorizing a plural number of voltage values applied in multiple steps on each of said electrodes.

10. An image displaying device comprising:
an electron beam emitting device; and
a light emitting member which displays an image by emitting light from said light emitting member by irradiation of an electron beam emitted from said electron beam emitting device,
said electron beam emitting device comprising a thin film device of a surface conduction type, said thin film device comprising:
  a substrate;
  an electron emitting area; and
  at least a pair of electrodes for passing current through said electron emitting area, wherein said electron emitting area and said electrodes are provided on said substrate and electrons are emitted by passing a current through said electron emitting area; and
voltage applying for independently applying a voltage to each of said electrodes, wherein said voltage applying means applies a voltage to each of said electrodes so that one of said electrodes may become higher or lower in potential relative to the other of said electrodes.

11. An image displaying device according to claim 10, further comprising a plurality of said light emitting members are arranged along a plurality of columns and rows.

12. An image displaying device according to claim 10, further comprising a plurality of said electron beam emitting devices arranged along a plurality of columns and rows.

13. An image displaying device according to claim 10, wherein a plural number of said light emitting members are provided for one electron beam emitting device.

14. An image displaying device according to claim 10, wherein said voltage applying means has a power source and a switch provided between said power source and said electrodes.

15. An image displaying device according to claim 10, wherein said voltage applying means applies a voltage on either one of said electrodes.

16. An image displaying device according to claim 10, wherein said voltage applying means applies a voltage on one of said electrodes, and applies no voltage on the other of said electrodes.

17. An image displaying device comprising:
an electron beam emitting device; and
a light emitting member which displays an image by emitting light from said light emitting member by irradiation of an electron beam emitted from said electron beam emitting device;
said electron beam emitting device comprising:
a thin film device of a surface conduction type, said thin film device comprising:
  a substrate;
  an electron emitting area; and
  at least a pair of electrodes for passing current through said electron emitting area and electrons are emitted by passing a current through said electron emitting area; and
voltage applying means for independently applying a voltage to each of said electrodes, wherein said voltage applying means varies the magnitude of the voltage applied to each of said electrodes and applies a voltage to each of said electrodes so that one of said electrodes may become higher or lower in potential relative to the other of said electrodes.

18. An image displaying device according to claim 17, further comprising a plurality of said light emitting members arranged along a plurality of columns and rows.

19. An image displaying device according to claim 17, further comprising a plurality of said electron beam emitting devices arranged along a plurality of columns and rows.

20. An image displaying device according to claim 17, wherein a plural number of said light emitting members are provided for one electron beam emitting device.

21. An image displaying device according to claim 17, wherein said voltage applying means has a power source and a D/A converter.

22. An image displaying device according to claim 17, wherein said voltage applying means applies a voltage on either one of said electrodes.

23. An image displaying device according to claim 17, wherein said voltage applying means applies a voltage on one of said electrodes, and applies no voltage on the other of said electrodes.

24. An image displaying device according to claim 17, wherein said voltage applying means has a memory means for memorizing a plural number of voltage values applied in multiple steps on each of said electrodes.

* * * * *

UNITED STATES PATENT AND TRADEMARK OFFICE
CERTIFICATE OF CORRECTION

PATENT NO. : 5,155,416
DATED : October 13, 1992
INVENTOR(S) : Hidetoshi Suzuki, et al It is certified that error appears in the above-indentified patent and that said Letters Patent is hereby corrected as shown below:

COLUMN 1

Line 23, "quality" should read --currently--.

COLUMN 2

Line 1, "ballance" should read --balance--.

COLUMN 4

Line 60, "denotes" should read --denotes a--.

COLUMN 5

Line 5, "applied-on" should read --applied on--.
Line 6, "electrode" should read --electrodes--.

COLUMN 6

Line 33, "the" (first occurrence) should read --and the--.
Line 34, "the," should read --the--.

COLUMN 8

Line 62, "a" (first occurrence) should be deleted.
Line 63, "voltage" should read --a voltage--.

UNITED STATES PATENT AND TRADEMARK OFFICE
CERTIFICATE OF CORRECTION

PATENT NO. : 5,155,416
DATED : October 13, 1992
INVENTOR(S) : Hidetoshi Suzuki, et al It is certified that error appears in the above-indentified patent and that said Letters Patent is hereby corrected as shown below:

COLUMN 9

Line 60, "are" should be deleted.

Signed and Sealed this

Twenty-eighth Day of December, 1993

Attest:

BRUCE LEHMAN

*Attesting Officer*     *Commissioner of Patents and Trademarks*